Patented Feb. 24, 1925.

1,527,470

UNITED STATES PATENT OFFICE.

HUGH S. COOPER, OF CLEVELAND, OHIO, ASSIGNOR TO KEMET LABORATORIES COMPANY, INC., A CORPORATION OF NEW YORK.

PROCESS OF MAKING ZIRCONIUM OXIDE.

No Drawing.    Application filed December 24, 1923. Serial No. 682,587.

*To all whom it may concern:*

Be it known that I, HUGH S. COOPER, a citizen of the United States, residing at Cleveland, in the county of Cuyahoga and State of Ohio, have invented certain new and useful Improvements in Processes of Making Zirconium Oxide, of which the following is a specification.

The invention is a process of preparing zirconium oxide of high purity from minerals in which zirconium is associated with silica. There are several such minerals, of which baddeleyite and zircon are the most important. The latter mineral is well adapted to serve as raw material for the present invention, being readily obtainable with a satisfactorily low iron content, and is preferred, but the other minerals of the class may be used. The oxide produced is useful as a clouding agent for vitreous enamels and for other purposes.

According to the invention, the mineral is decomposed and the silica converted into a soluble silicate by fusion with caustic soda. The decomposition of natural zirconium silicate by fusion with caustic soda has been frequently proposed, but in every case where the preparation of zirconium oxide was attempted by this method, the cost of production was so high that the method was practically eliminated as a commercial possibility. The principal item of cost was the large quantity of caustic soda which it was found necessary to use. Thus in the reissued patent to Kreidl, No. 13,791, it is stated that a "great surplus" of the alkaline agent is necessary, and the patentee recommends four weights of caustic soda per weight of the mineral even when he aims to remove only a part of the silica, while in U. S. Bureau of Mines Bulletin 186, it is stated (page 9) "on a commercial scale six to seven parts [of caustic] are necessary to one of zircon."

Another factor which contributed materially to increasing the cost of preparing zirconium oxide in prior experiments along the lines referred to, was the difficulty encountered in grinding zircon to prepare it for the caustic soda fusion. It has always been supposed that very fine grinding was necessary here, as zircon is crystalline, very compact, and by no means easy to decompose by fused caustic, and it is generally necessary, when a material requires a fusion to decompose it, to grind the material very fine before the fusion. Zircon is exceedingly hard and abrades mill linings so strongly that the upkeep of machinery for milling it is quite expensive.

In accordance with my invention it is possible to obviate the milling step entirely; to reduce materially the quantity of caustic required; to keep the production cost low in all other respects; and to obtain a good yield of very pure oxide.

I have discovered that milling of the zircon prior to the fusion may be omitted. The mineral comes on the market as coarse powder, only about 40% usually being fine enough to pass a 50 mesh screen. This fineness is sufficient to permit complete decomposition of the mineral by caustic fusion if the procedure hereinafter described is followed.

The rate at which the fused caustic attacks the unmilled zircon can be somewhat increased if the zircon is heated to a red heat and then quenched in water before the fusion. This step is not indispensable, however, and complete decomposition of the mineral can be obtained without employing it, by using as little as two weights of caustic soda to each weight of zircon in the fusion.

For the fusion I prefer high temperatures, by which is meant temperatures above about 800° C. Temperatures approaching 1100° C. give the best results in most cases, and in any event the temperature should be sufficient to keep the fused reagent at least semi-fluid after all frothing has ceased and the tendency toward solidification sets in. The lower the proportion of caustic used, the higher will be the temperature required. Salts such as sodium chlorid which by their presence serve to increase the fluidity of the zircon caustic soda melt, permit the temperature to be lowered somewhat. Thus with one part of zircon, two parts of caustic soda, and one-half part of sodium chlorid, thorough decomposition may be attained at 800° to 900° C. Without the sodium chlorid, the temperature should be increased to about 1050° C. The higher temperature with caustic soda alone as the fused bath is preferable on the whole, and is capable of giving a zirconium oxide containing considerably less than one per cent of silica.

In carrying out the decomposition, the caustic soda is first brought to quiet fusion, preferably in a nickel crucible. Two parts of caustic per part of zircon will ordinarily be sufficient if a temperature above 1000° C. is to be used, while with 3 to 3½ parts of caustic, the maximum temperature may be reduced to about 800° C.

The zircon is added in successive small portions, the frothing following each addition being permitted to subside before the next addition. A sufficient temperature is maintained throughout to keep the melt fluid. When only two parts of caustic are used, it will be found that when the zircon has all been added, there will be a strong tendency for the melt to solidify, and it will be necessary to increase the temperature above 1000° C. to secure the necessary semi-fluid condition. This condition is maintained for about 30 minutes, with occasional stirring of the melt, and the latter is then poured onto a nickel slab to solidify.

Water is added to the solid cake and the insoluble residue is washed by decantation until the washings show a slight turbidity, indicating that the relatively insoluble zirconate is dissociating. Hydrolysis of the zirconate in the wash water produces the turbidity referred to. The mass is then boiled thoroughly with water to decompose all zirconate, and the insoluble matter is washed free from alkali. Iron may then be removed by boiling the oxide with dilute sulphuric acid (about 1% $H_2SO_4$) and the oxide is washed free from acid, dried, and calcined.

The following is given as a typical analysis of the final product:

$ZrO_2$ }
$TiO_2$ } _____ 97.96
$Fe_2O_3$ _____ 0.10
$SiO_2$ _____ 0.17
Rare earths _____ 1.20
Loss on ignition _____ 0.34
                                99.77

A small amount of rare earths is usually present, as indicated in the above analysis. The rare earths and the $TiO_2$ may impart an ivory or even a light tan color to the calcined product, but it will be found that the product will nevertheless give pure white enamels. Any color produced by iron will, on the contrary, be carried into the enamel, and the removal of iron is therefore highly desirable.

I claim:

1. Process of preparing coarsely powdered zircon for decomposition by fused caustic soda which comprises heating the zircon to a red heat and quenching it.

2. Process of decomposing coarsely powdered zircon which comprises heating the zircon to a red heat, quenching it, and then subjecting the unground zircon to the action of fused caustic soda.

3. Process of decomposing coarsely powdered zircon which comprises subjecting the unground zircon to the action of less than four times its weight of fused caustic soda, at a temperature above 800° C.

4. Process of decomposing coarsely powdered zircon which comprises subjecting the unground zircon to the action of fused caustic soda, at a temperature above 1000° C.

5. Process of decomposing zircon which comprises subjecting it to the action of less than three times its weight of fused caustic soda, at a temperature above 1000° C. until substantially the entire silica content of the zircon becomes water-soluble.

6. In the process of making zirconium oxide from zirconium ores, the steps of subjecting the ore to the action of fused caustic soda until the silica is converted into water-soluble form; cooling the fused product and leaching out the excess caustic and the soluble silicates; and rendering the zirconium insoluble during the leaching by subjecting the material which is being leached to protracted boiling with water.

7. In the process of making zirconium oxide from zirconium ores, the steps of subjecting the ore to the action of fused caustic soda to convert the silica and zirconia into silicates and zirconates; decomposing zirconate and rendering the zirconium insoluble by protracted boiling with water; and leaching the soluble substances from the insoluble zirconium compounds.

8. In the process of making zirconium oxide from zircon, the steps of subjecting the zircon to the action of fused caustic soda until the silica is converted into water-soluble form; cooling the fused product and leaching out the excess caustic and the soluble silicates; and rendering the zirconium insoluble during the leaching by subjecting the material which is being leached to protracted boiling with water.

9. In the process of making zirconium oxide from zircon, the steps of subjecting the zircon to the action of fused caustic soda to convert the silica and zirconia into silicates and zirconates; decomposing zirconate and rendering the zirconium insoluble by protracted boiling with water; and leaching the soluble substances from the insoluble zirconium compounds.

In testimony whereof, I affix my signature.

HUGH S. COOPER.